United States Patent [19]

Nagai et al.

[11] Patent Number: 4,997,192
[45] Date of Patent: Mar. 5, 1991

[54] MECHANICAL SEAL USING PORE-DISPERSED MATERIAL, AND PORE-DISPERSED CEMENTED CARBIDE AND METHOD FOR MANUFACTURING SAME

[75] Inventors: Yataro Nagai; Mitsuyoshi Matsushita, both of Tokyo; Osamu Ishibashi, Fukuoka; Kiyoshi Terasaki, Fukuoka; Kei Tokumoto, Fukuoka, all of Japan

[73] Assignees: Tanken Seiko Kabushiki Kaisha, Tokyo; Nihon Tungsten Kabushiki Kaisha, Fukuoka, both of Japan

[21] Appl. No.: 495,350

[22] Filed: Mar. 19, 1990

Related U.S. Application Data

[62] Division of Ser. No. 284,983, Dec. 15, 1988, Pat. No. 4,925,190.

[30] Foreign Application Priority Data

Dec. 28, 1987 [JP] Japan .................. 62-335423
Aug. 15, 1988 [JP] Japan .................. 63-202011

[51] Int. Cl.$^5$ .................. F16J 15/20; F16J 15/34
[52] U.S. Cl. .................. 277/81 R; 277/96.2; 277/DIG. 6
[58] Field of Search .................. 75/238, 239, 240, 241, 75/242, 244; 277/81 R, 96, 96.1, 96.2, DIG. 6; 501/81

[56] References Cited

U.S. PATENT DOCUMENTS

| 3,122,375 | 2/1964 | Greenwald | 277/96 X |
| 3,822,066 | 7/1974 | Keys | 277/96 |
| 3,903,959 | 9/1975 | Fushimi et al. | 277/96.2 X |
| 3,926,443 | 12/1975 | Fenerty et al. | 277/96.2 |
| 4,000,980 | 1/1977 | Morishita et al. | 75/244 X |
| 4,416,458 | 11/1983 | Takenaka et al. | 277/96.2 X |

FOREIGN PATENT DOCUMENTS 754148  8/1980  U.S.S.R. .................. 277/96.1

OTHER PUBLICATIONS

"Seals and Sealing Handbook": pp. 382-386, published 1981.

Primary Examiner—Allan N. Shoap
Assistant Examiner—Scott Cummings
Attorney, Agent, or Firm—Henry C. Nields

[57] ABSTRACT

A mechanical seal is, at a sliding surface and at its vicinty, formed of a pore-dispersed cemented carbide, so that the lubricating characteristics can be improved and the strength maintained by strictly stipulating the magnitude, shape, and volumetric ratio of the pores, such that pores are contained in an amount of 0.5 to 20 volume %, formed in at least one shape selected from the group of a substantialy spherical shape and a substantially cylindrical shape, the pores in the substantially spherical shape having an average diameter of 3 to 20 μm, the pores in the substantially cylindrical shape having an average diameter of 3 to 20 μm and an average length in the range from the average diameter up to 300 μm, and that the pores are prevented from linking to each other to give a length greater than 2 mm.

2 Claims, 6 Drawing Sheets

FIG. 3A
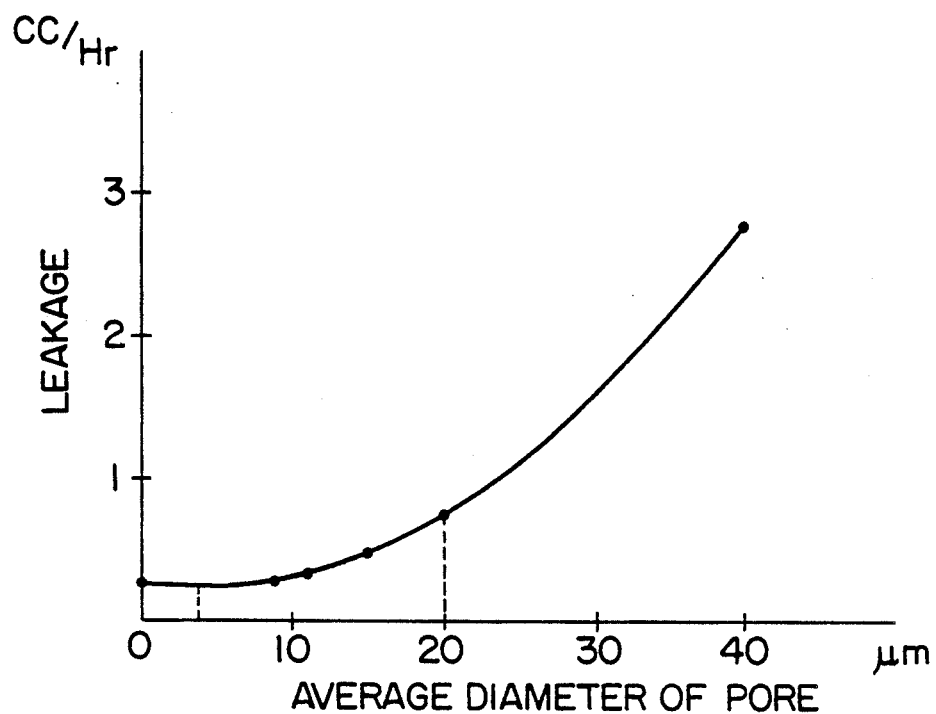
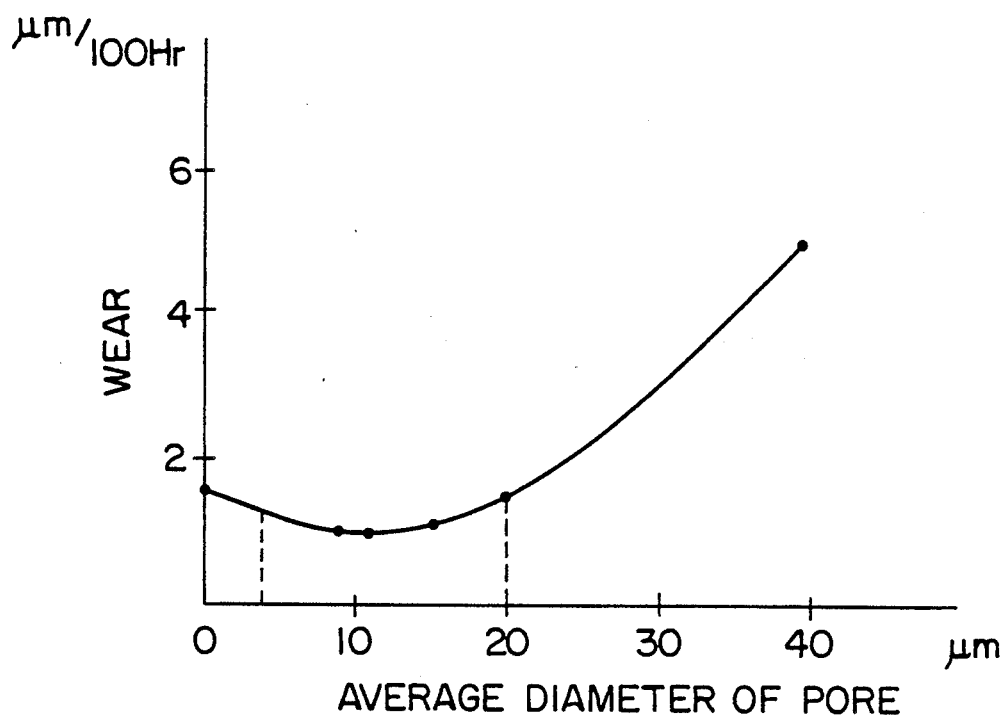
FIG. 3B

MECHANICAL SEAL USING PORE-DISPERSED MATERIAL, AND PORE-DISPERSED CEMENTED CARBIDE AND METHOD FOR MANUFACTURING SAME

This application is a division of application Ser. No. 284,983, filed Dec. 15, 1988, now U.S. Pat. No. 4,925,190.

FIELD OF THE INVENTION

The present invention relates to a porous, cemented carbide suitable as a material for use in a mechanical seal and a sliding member comprising seal ring, bearing, and the like.

BACKGROUND OF THE INVENTION

In a conventional mechanical seal, a sliding surface in the form of a seal ring, which contacts and slides on a mating material to seal a fluid, is normally of a flat shape. And, this surface is a so-called mirror surface in which pores and the like do not exist (at least, not by design).

This type of mechanical seal has various combinations of members. The mechanical seal for use in a service with a large PV value (where P is the pressure of the sealed fluid and V is the peripheral velocity) is mostly selected from the combinations of cemented carbide/carbon, and cemented carbide/cemented carbide.

However, in a freezer and the like, in addition to requiring a high PV value, a large thermal shock is experienced because of the repetition of running and stopping, and there are problems such that heat cracks are produced in the sliding surface, and that with carbon material, bulges known as blisters are produced.

Many different proposals have been presented to increase the lubricating ability of the sliding surface, in order to eliminate this type of problem.

One such proposal presents a design in which the shape of the seal ring is modified to increase the lubricating ability. For example, there is provided an end-face lubricating seal (hydrostatic seal) in which a plurality of through holes are provided between the sliding surface and the opposite surface, and a lubricating fluid is fed by a pump from the holes in the opposite surface to the sliding surface; or, there is a hydrodynamic seal provided with a channel or a notch extending from the fluid side into the sliding surface close to its center, which conducts a sealed fluid, which plays the role of a lubricant during operation, to the sliding section by means of a wedge effect based on the viscosity of the fluid; or, there is a thermohydrodynamic seal, or the like. These can be used at a higher PV value than conventional seals to reduce the coefficient of friction.

However, with this type of hydrostatic seal, hydrodynamic seal, or thermohydrodynamic seal and the like, in order to bring about that effect, a complicated process must be performed on a cemented carbide, and, in considering the difficulty in processing the cemented carbide, the processing time is exceedingly long in comparison with the conventional seal. Furthermore, there is the drawback that when the shape of the cemented carbide is complicated, stress concentration is readily produced and breakage can easily occur. Accordingly, this type of seal can only be used in limited applications at the present time. Therefore, a new material is required for which this type of processing is unnecessary.

In a sliding surface which must answer to this sort of demand, a mechanical seal with high lubricating characteristics at the sliding surface has been proposed in which after a lapping process, or shot blast process, or etching process is performed, a polishing process is applied to the sliding surface, so that a plurality of minute holes are formed. However, in the case of this type of structure, because the holes are very small and only formed at the sliding surface, the holes disappear as the sliding surface is subjected to wear, so there is the drawback that the improved lubrication result cannot be maintained for a long period of time.

In addition, a mechanical seal has been proposed in which the seal ring itself formed with a porous material. In this case, the strength of the seal ring is reduced, so that a high PV value cannot be obtained, and in addition, another problem occurs wherein the leakage from the holes cannot be ignored if the magnitude and volume of the holes are significantly large.

SUMMARY OF THE INVENTION

An object of the present invention is to provide, with due consideration to the drawbacks of such conventional devices, a mechanical seal which is, at least at the seal surface and its vicinity, formed of a pre-dispersed material wherein the pores are generally dispersed, and the lubricating characteristics can be improved and the strength maintained by strictly stipulating the magnitude, shape, and volumetric ratio of the pores.

A further object of the present invention is to provide a pore-dispersed cemented carbide satisfying an application as a seal ring and the like, and a manufacturing method for this pore-dispersed cemented carbide.

BRIEF DESCRIPTION OF THE DRAWINGS

These and other objects, features, and advantages of the present invention will become more apparent from the following description of the preferred embodiments taken in conjunction with the accompanying drawings, in which:

FIG. 3A is a graph showing the relationship between the pore diameter and leakage volume.

FIG. 3B is a graph showing the relationship between the pore diameter and amount of wear.

DETAILED DESCRIPTION OF THE PREFERRED EMBODIMENTS

Figure 1:
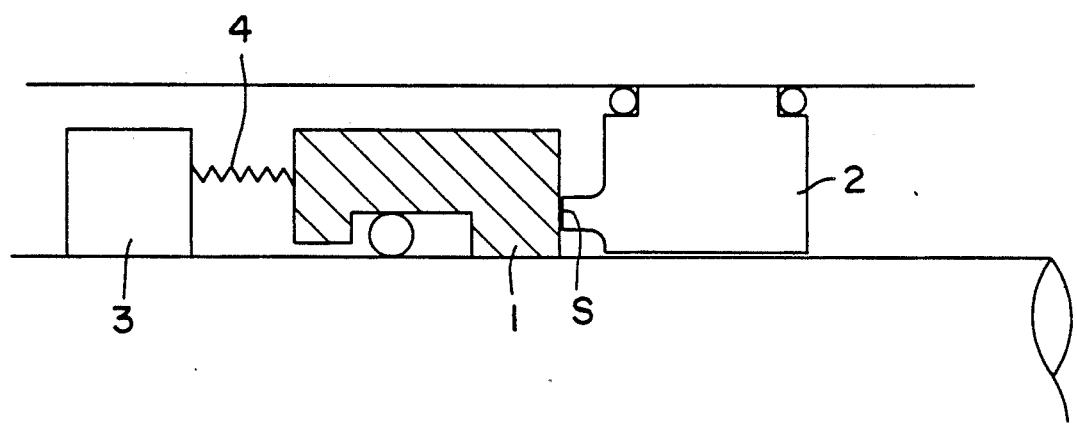
FIG. 1 and FIG. 2 are partially cross sectional view showing an embodiment of a mechanical seal of the present invention.

Now referring to FIG. 1, a sealing surface S is formed from a rotating seal ring 1 and a non-rotating seal ring 2. The rotating seal ring 1 is pressed by means of a spring 4 mounted on a stopper 3. In this embodiment of the present invention, the rotating seal ring 1 is made of a pore-dispersed material. However, the non-rotating seal ring 2 may be made of a pore-dispersed material, or both may be made of a pore-dispersed material.

The limitations of the pores of the pore-dispersed material used as the material of the rotating seal ring 1 in the present invention are outlined later.

With reference to the materials such as a ceramic or a cemented carbide which can be used as a pore-dispersed material, the ceramics are low in strength in comparison with the cemented carbides and are lacking in resistance to thermal shock, so that they are unfit for use at high PV values. On the other hand, the cemented carbides, even with pores dispersed therethrough, are stronger than ceramics with no pores and are much superior for use at high PV values.

In the present invention, the composition of the cemented carbide is also subject to strict limitations as outlined below.

SHAPE AND SIZE OF THE PORE

The fluid is maintained in the pores in the sliding surface. In addition, the fluid is supplied to the inside of the sliding surface and acts to maintain a fluid film on the sliding surface. Accordingly, any shape can be satisfactory for this action. However, when stress concentration is produced in a distorted shape of the pore, especially a shape with sharply angled corners, a sintered body is easily broken. Therefore, the shape is made almost spherical or almost cylindrical.

On the other hand, when the pores are too small, the fluid film maintenance effect is small, and the lubrication capabilities are not sustained. Therefore, in the case of both the spherical and cylindrical shapes, the average diameter must be 3 $\mu$ or greater. For a cylindrical shape, the length must be at least be equal to the average diameter. When the pores are large, the fluid film effect is maintained, but when the pores become very large, leakage from the pores is excessive and abrasion of the mating seal becomes significant while there is too great a reduction in the strength of the material. For this reason, spherical pores must have an average diameter of 20 $\mu$m or less, and cylindrical pores must have an average diameter or 20 $\mu$m or less and an average length of 300 $\mu$m or less. Further, in cases where strength is particularly important it is desirable that the average diameter be 16 $\mu$m or less.

FIG. 3 shows the relationship between average pore diameter and leakage volume, and between average pore diameter and amount of wear. These graphs are based on Cemented Carbide 3 of the present invention as indicated in Table 1 to form a mechanical seal comprising a 60 mm diameter seal ring and carbon seal ring, in which a variety of pore diameters are included. The results of the graphs were obtained by operating for 100 hours continuously at 3600 RPM, wherein a turbine oil was used as the sealed liquid at a pressure of 4 kg/cm$^2$ and a temperature of 40° to 50° C.

As can be understood from these graphs, if the average pore diameter exceeds 20 $\mu$m, both the leakage volume and amount of wear become large, exceeding the practical operating range. Accordingly, the diameters are restricted to the above range.

VOLUMETRIC RATIO OF THE PORE

The pore volume must be large to maintain the fluid film effect. Therefore the minimum pore amount is 0.5% by volume. On the other hand, if the pore exceed 20% by volume, it is easy for the individual pores to become linked and the strength of the material is reduced. Therefore the upper limit is 20% by volume. A desirable range is 10 to 15% by volume.

PORE LINKAGE

When the pores are linked in a long range such that the interconnected pores extend through the sintered body, the sealed fluid passes through these pores and leaks out, so that the sintered body is no longer useful as a seal ring member. For this reason the pores must not be linked to a length of 2 mm or greater.

In the seal ring 1 formed from a pore-dispersed material as outlined above, a sealed liquid or the like is accumulated in the pores, and on start up, the liquid swells due to the heat generated from the sliding of the seal ring and oozes out onto the surface S of the seal so that a film is formed on the film surface S and the lubrication capability is maintained. Also, the pores become larger and deeper than those produced by a conventional polishing process and are located not only at the face of the seal surface S, but also dispersed throughout the internal portion of the material so that, even if the seal surface S of the seal ring 1 is subjected to wear, new pores appear on the surface and the effective maintenance of the lubrication capability is not lost.

Figure 2:
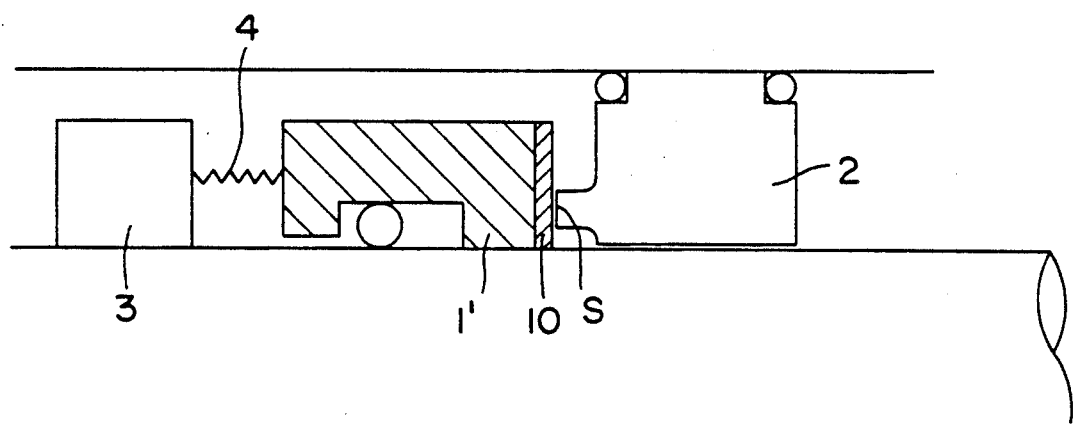

It is not necessary that the pore-dispersed material be used for the entire seal ring. As shown in FIG. 2, only an end face section 10 of a seal ring 1' can be made of the pore-dispersed material. The thickness of the end face section 10 of the seal ring 1' made of the pore-dispersed material may be suitably determined. In this way, when only the end face section 10 of the seal ring 1' is made of the pore-dispersed material, the strength of the seal ring 1' can be increased. For example, if the body of the seal ring 1' is formed from a normal cemented carbide and the seal end face section 10 is formed from a pore-dispersed material of a cemented carbide which is later described, a greater strength can be obtained than if the entire seal ring were formed from a pore-dispersed cemented carbide. The method for forming only the end face section 10 from the pore-dispersed material will be later described.

COMPOSITION OF THE CEMENTED CARBIDE

The cemented carbide of the present invention is limited in the following manner.

The cemented carbide is comprised of a sintered body consisting of at least one member selected from the group of carbides, nitrides and borides of transition metals of Groups IV, V and VI of the Periodic Table and a solid solution of these carbides, nitrides and borides, the incidental impurities, wherein the pores are contained in an amount of 0.5 to 20 volume % the pores being formed in at least one shape selected from the group of a substantially spherical shape and a substantially cylindrical shape, the pores in the substantially spherical shape having an average diameter of 3 to 20 $\mu$, the pores in the substantially cylindrical shape having an average diameter of 3 to 20 $\mu$m and an average length in the range from the average diameter up to 300 $\mu$m, and the pores being prevented from linking to each other to give a length greater than 2 mm.

In the present invention, as mentioned above, the material is selected from the group of carbides, nitrides, or borides of transition metals of Groups IV, V and VI of the Periodic Table, for more importance is placed on corrosion resistance than strength. Further, impurities related to the raw material powder and the manufacturing process for these materials are mixed in, but its amount is limited to the most 0.5 mass %.

On the other hand, for an application in which strength is of more importance than corrosion resistance, it is desirable to include at least one member selected from among the iron family of metals so as to improve the toughness. This member is not effective at the amount of less than 0.1 mass %. On the other hand, if it exceeds 30 mass %, toughness will be compromised by lower hardness and its resistance to abrasion will deteriorate. Therefore, the range must be limited to the range of 0.1 to 30 mass %.

Furthermore, as required, in these two types of cemented carbides, the least one member selected from the group of carbides, nitrides and borides of transition metals of Groups IV, V and VI of the Periodic Table and a solid solution of the carbides, nitrides and borides can be substituted by at least one member selected from the group of the transition metals of Groups IV, V and VI of the Periodic Table by an amount of 0.1 to 5 mass %. This is effective in improving the corrosion resistance, especially in the case where a cemented carbide contains an iron family metal. By substituting and adding 0.1 to 5 mass % of at least one member of the transition metals of Groups IV, V and VI of the Periodic Table, such as chromium or molybdenum, an increase in corrosion resistance is provided.

The reason for limiting the diameter, shape and volume of the pores is as previously outlined.

Next, the method of manufacturing the pore-dispersed cemented carbide of the present invention will be explained.

In the present invention, the process for manufacturing the material of the present invention comprises an A step wherein the above mentioned materials are prepared. Specifically, in one case, a powder consists of at least one member selected from the group of carbides, nitrides and borides of transition metals of Groups IV, V and VI of the Periodic Table and a solid solution of the carbides, nitrides and borides, and incidental impurities; in another case, a powder consists of at least one member selected from the group of carbides, nitrides and borides of transition metals of Groups IV, V and VI of the Periodic Table and a solid solution of the carbides, nitrides and borides in an amount of 70 to 99.9 mass %, at least one member selected from the group of the iron family of metals in an amount of 0.1 to 3 mass %, and incidental impurities; still in another case, a powder consists either of the powers mentioned above wherein the at least one member selected from the group of the carbides, nitrides and borides of transition metals of Groups IV, V and VI of the Periodic Table, and a solid solution of the carbides, nitrides and borides are substituted by at least one member of transition metals of Groups IV, V and VI of the Periodic Table in an amount of 0.1 to 5 mass %.

Added to the powder in an amount of 0.5 to 50 mass % is a pore-forming material which is a solid at room temperature, and contains an organic material, 90% or more of which is volatilized or decomposed and evaporated at a temperature lower than the temperature required for sintering the above powders. The pore-former material is substantially spherical with an average diameter of 3 to 30 $\mu$m, and/or substantially cylindrical with an average diameter of 3 to 30 $\mu$m and an average length equal to or greater than the average diameter and equal or less than 370 $\mu$m.

The process for manufacturing the material of the present invention further comprises a B step in which the blended powder obtained from the A step is formed into an optional form by compression or the like; a C step in which the material obtained in the B step is presintered in a non-oxidizing atmosphere at an adequate temperature for the volatilization or decomposition and evaporation of 90 % or more of the organic pore-forming material; and a D step in which the presintered body obtained in the C step is sintered in a non-oxidizing atmosphere at a necessary temperature for a necessary time for sintering.

Further, it is possible to perform the C and D steps consecutively within the same furnace. In addition, it is possible to insert between the C and D steps a process wherein the presintered body obtained in the C step is optionally formed by cutting or grinding.

Next, the reasons for the limitations of the manufacturing method of the present invention are explained.

PROPERTY OF THE ORGANIC MATERIAL

Because the traces remaining after the organic material is driven off become the pores, this organic material is added and blended before the optional shape is formed by compression or the like. Accordingly, it is necessary that the shape be hardly collapsed during mixing and/or compression. Therefore it is necessary that the organic material is a solid at room temperature.

On the other hand, after the powder is formed in a shape by means of compression or the like, the greater part of the organic material must be volatilized or decomposed and evaporated at a temperature lower than the sintering temperature to avoid affecting the sintering.

Accordingly, the organic material must be a solid at room temperature and 90% or more must be volatilized or decomposed and evaporated at a temperature lower than the sintering temperature.

SHAPE AND SIZE OF THE ORGANIC MATERIAL

The coefficient of linear contraction of the cemented carbide is about 20% although it changes by a few percents depending on its composition. Accordingly, the voids left from the volatilization of decomposition and evaporation of the organic material contract by about 20% to become the pores. However, the contraction ratio of the pores changes depending on the diameter and sintering temperature of the organic material. Accordingly, the shape of the organic material is the same as that of the object pores, and the dimensions are substantially 20% larger than the dimensions of the object pores. From the above, the present invention is limited to a substantially spherical organic material with an average diameter of 3 to 30 $\mu$m, or a substantially cylindrical material with an average diameter of 3 to 30 $\mu$m and average length equal to or greater than the average diameter and equal to or less than 370 $\mu$m.

VOLUMETRIC RATIO

The voids remaining after the volatilization or decomposition and evaporation of the organic material contract by about 20% to become the pores as mentioned above. When these dimensions are small, it is also possible for the pores to completely contract during the sintering process so that no pore remains. Accordingly, the amount of organic material added is in the range of 0.5 to 50% by volume.

PRESINTERING AND SINTERING ENVIRONMENT

Cemented carbides are alloys of a non-oxide system. Because they are oxidized at high temperatures, the presintering and sintering atmospheres are non-oxidizing. Other factor such as temperature and times can conform with standard methods for manufacturing the cemented carbides. However, depending on the type and amount of organic material, the volatilization or decomposition and evaporation may need a long time. Accordingly, some cemented carbides may experience cracks or unsufficient volatilization, decomposition or evaporation during presintering. In this type of case, it is necessary e.g. to keep the rate of temperature increase small during presintering. Further, by suitably controlling the sintering temperature and time, the volumetric ratio of the pores can be controlled from several percent to about 20%.

Next, the manufacturing process will be explained by which only the end face section 10 is made of the pore-dispersed material and the other portions are fabricated of normal materials containing no pores.

There are two types of processes. In one, first the powder obtained by means of the above-mentioned A step is pressed. This pressed body is placed in a press mold, then pressed together with a normal cemented carbide raw material powder which does not contain a pore forming resin, to obtain an integrally formed body. This is made into a sintered body by means of the above-mentioned B to D steps. With this process it is easy to prepare a sintered material in which one part is a pore-dispersed material (cemented carbide), and the remainder is a normal material (cemented carbide) containing no pores. Further, in this case it is acceptable that the compositions of the two cemented carbides are not the same to each other, but the sintering temperatures of these cemented carbides must be close (the difference within 50° C.). If this is not the case, the pressed bodies can become abnormally deformed during sintering and, in extreme cases, can fracture.

In addition, the pressing sequence of the two types of powders may be reversed, and different molds may be used, rather than the same mold as outlined above. For example, the powder obtained from the A step can be pressed in one mold, then can be transferred from the first mold to a larger mold and pressed together with a normal cemented carbide powder which does not contain a resin, to obtain an integrally formed body. The sintered body is then obtained by the same processes as above. When this is done, the part which is the pore-dispersed cemented carbide is surrounded on three sides y the cemented carbide which does not contain pores, making it possible to obtain a stronger seal ring.

The other method is as follows. First, a pore-dispersed material (cemented carbide) is made, then a normal material (cemented carbide) containing nompores is made separately. These two bodies are then formed into an integrated body by soldering or by means of a diffusion bonding, or the like. In this manner, in the same way as above, a seal ring is obtained in which one part is a pore-dispersed cemented carbide, and the remainder is a normal cemented carbide containing no pores. In this case, both compositions can be freely selected, so that if the latter is fabricated as an especially high strength cemented carbide, the seal ring itself is stronger.

The details of the soldering and diffusion bonding processes are as follows.

The soldering process will first be outlined. The surface of the cemented carbides which are to be soldered are first ground with a diamond grindstone or the like and a surface obtained with an R max of about 10 $\mu$m or less. These surfaces are cleaned with a suitable solvent and a suitable amount of solder in the form of a rod or plate is introduced between them. The solder is heated to a suitable temperature and the soldering operation is performed. Solders which can desirably be used are Ni solder and Ag solder. However, the former is preferable when emphasis is to be put on corrosion resistance.

Next, the diffusion bonding process will be described. The surface for the diffusion bonding undergoes the similar process until the similar roughness is obtained as in the soldering process, and cleaning is done in the same way. Then, the two surfaces to be joined are brought together and heated to close to the sintering temperature (about 50° C. below the sintering temperature) in a non-oxidizing atmosphere, and this temperature is maintained for about 10 to 30 minutes. In this way the two surfaces are easily bonded through diffusion bonding.

Incidentally, the fact that bonding by the soldering or by the diffusion bonding process is easily achieved is an inherent advantage in using cemented carbides rather than ceramics.

The present invention will now be explained with reference to specific embodiments.

EMBODIMENT 1

As raw materials, a WC powder with an average particle diameter of 1.3 $\mu$m and a Co powder with an average particle diameter of 1.3 $\mu$m were blended to give a composition of WC-6.5 mass % Co, and were mixed in a wet process under methanol for three days in a ball mill. This mixed powder was dried, and paraffin dissolved in trichloroethane was added for mixing to give 2 mass % with respect to the powder, and again dried to give a base powder. An organic powder of the type, shape, dimensions and amount with respect to the base powder as shown in Table 1 was charged as a pore forming material into a blending machine and blended to obtain the various types of raw material powder. In addition, in this case, the amount of carbon in the raw material powder is adjusted as required so that neither carbon nor $\eta$-phase is produced in the sintered body.

These powders were pressed at a pressure of 1 ton/cm² to form a green compact of 5.5×10×30 mm. This green compact was heated to 800° C. for 10 hours under vacuum (about 0.1 torr) to give a presintered material. The material was then sintered under a vacuum of 0.1 to 0.3 torr at 1370° C. for one hour to obtain, respectively Cemented Carbides 1 to 13 of the present invention, and Comparative Cemented Carbides 1 to 4 for reference, except that because cracks were produced in Cemented Carbides 3, 4, 7, and 13 of the present invention, and Comparative Cemented Carbides 2 for reference in the presintered state, the heating time was doubled to the 10 hour period.

Cemented Carbides 1 to 13 of the present invention and Comparative Cemented Carbides 1 to 4 obtained in this manner, were first ground with a diamond wheel, then four test samples of 4×8×24 mm were prepared for the JIS Deflection Test in each of the cemented carbides. The density and hardness (HRA) was measured for each of these test samples and, in addition, the deflective strength was measured by three point bending at a span of 20 mm. The volume ratio of the pores was calculated from the density.

These results are also given in Table 1.

Figure 8:
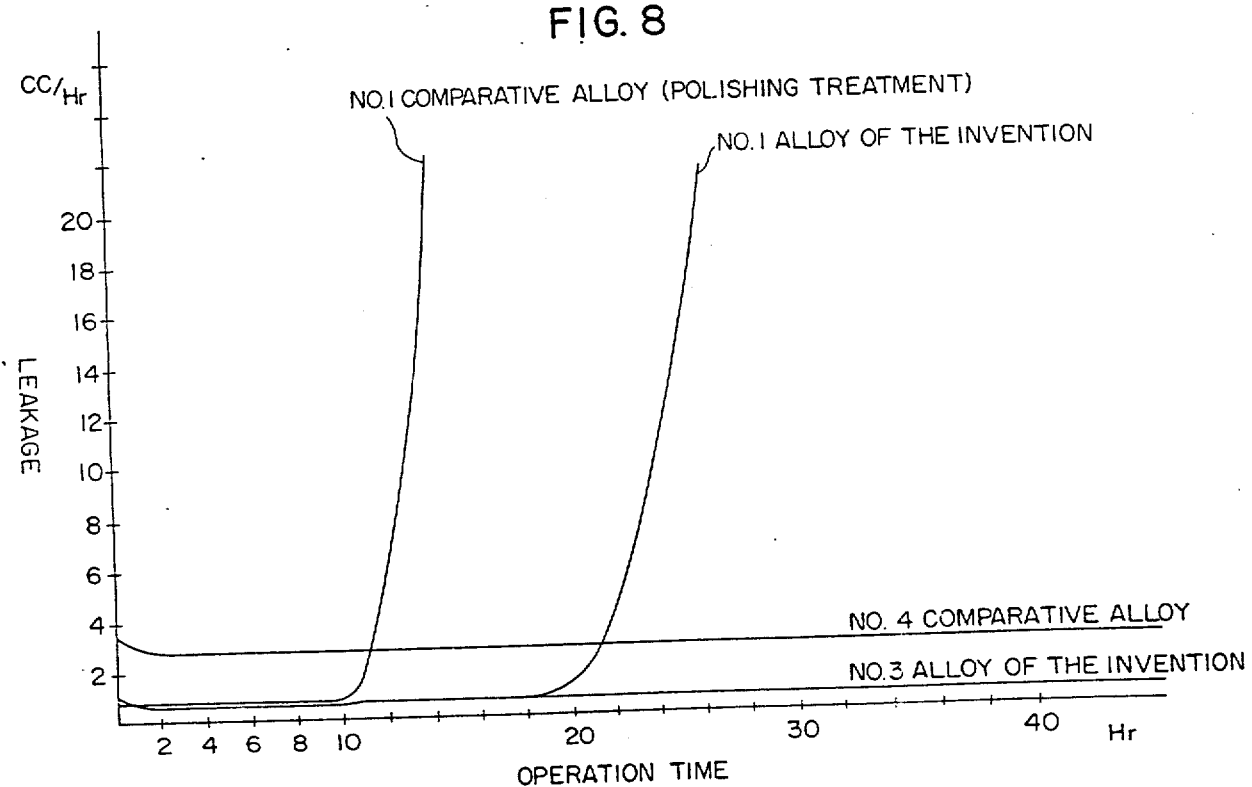
FIG. 8 is a graph showing the relationship between volume of leakage and operation time.

The volume ratios of the pores of Cemented Carbides 1 to 13 prepared by the method of the present invention are 0.5 to 18.7% by volume and are judged to satisfy the limiting range of 0.5 to 20% by volume. However, Comparative Cemented Carbide 1 does not have any pores and does not satisfy the limits. In Comparative Cemented Carbide 2, the size and volume ratio are too large, and in Comparative Cemented Carbide 3, the size of the pores is too large, so that the deflective strength is 40 kg/mm$^2$ or lower in these comparative cemented carbides. They were therefore judged to be unsuitable for practical application. The deflective strength of Comparative Cemented Carbide 4 is relatively large, but because the pore size is large, the leakage volume is too great, as shown in FIG. 8, so that this material is of no practical use.

Figure 4:
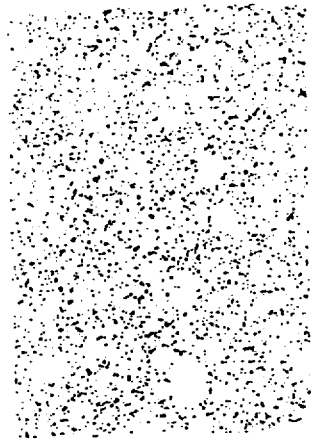
FIG. 4, FIG. 5, and FIG. 6 are photographs (enlarged 50 times) of the microstructure of Cemented Carbides 2, 6 and 8 of the present invention.
Figure 5:
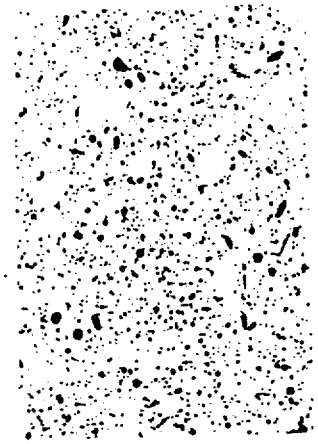
Figure 6:
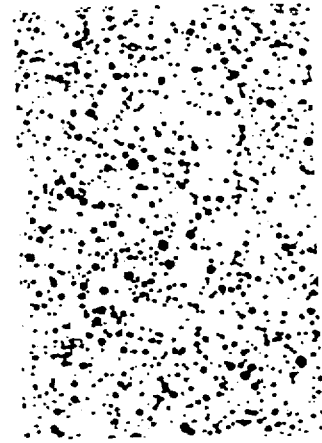

A study of the structure of these test samples shows that, in all cases, the pore size is about 80% of the particle size of the organic material. In confirmation, the respective microstructure photographs are shown in FIGS. 4 to 6 for Cemented Carbides 2, 6 and 8 of the present invention. From these photographs, it is concluded that, at the most, only six pores are linked together. This is found to be true for the other cemented carbides of the present invention. Accordingly, it is estimated that the pore linkage at the maximum is 0.3 mm$\times$6=1.8 mm, and this is judged to satisfy the limiting range.

From the above, it can be said that only the cemented carbides produced by the method of the present invention satisfy this limiting range.

EMBODIMENT 2

A WC powder with an average particle diameter of 1.0 to 5.0 $\mu$m and the powders shown in Table 2 (average particle diameter of 1.0 to 3.0 $\mu$m were used as raw materials. These powders were blended in the formulation shown in Table 2, then mixed, dried, mixed with paraffin and redried under the same as for Embodiment 1. Following this, a high density polyethylene with an average diameter of 19 $\mu$m was added in the quantity shown in Table 2 and blended in the same way as for Embodiment 1. These powders were compacted, and the resulting green compact was presintered in the same way as for Embodiment 1. Then the presintered material was sintered for one hour under vacuum (0.1 to 0.3 torr) at the temperature shown in Table 2, to obtain Cemented Carbides 14 to 27 of the present invention, and Comparative Cemented Carbides 5 to 9.

The resulting cemented carbides were processed, and their characteristics measured in the same way as for Embodiment 1 are shown in Table 2.

Incidentally, the composition of WC/TiC/TaC in Table 2 means a solid solution comprising 50 mass % WC, 30 mass % TiC and 20 mass % TaC, while the composition of TiC/TiN means a solid solution comprising 50 mass % TiC and 50 mass TiN.

Cemented Carbides 14 to 27 of the present invention, and Comparative Cemented Carbides 5 for reference all have a volume ratio in the range of 0.5 to 20.0% volume, but Comparative Cemented Carbides 6 to 9 for reference were determined to be outside the range. Comparative Cemented Carbides 5, as previously outlined, satisfies the requirements for pore volume ratio at the surface, but it is extremely low in hardness and is lacking in resistance to wear. The photographs have been omitted, but the average pore diameters for Cemented Carbides 14 to 27 of the present invention are all about 15 $\mu$m, and only a few of these pores are linked. Accordingly, it can be said that only Cemented Carbides 14 to 27 made by the method of the present invention fall within the limiting range.

EMBODIMENT 3

Embodiments 1 and 2 will justify the method of the present invention, and some cemented carbides were evaluated for performance when used in a sealing ring.

Specifically, test ring with a sliding surface having an inner diameter of 41 mm and an outer diameter of 56 mm were prepared using the methods of Embodiments 1 and 2. A mirror finish was applied to the sliding surface by lapping. Next, carbon rings with an inner diameter of 43 mm and an outer diameter of 52 mm were prepared as the mating sliding surfaces, and these sliding surfaces were also given a mirror finish by lapping. These test pieces were mounted in a mechanical seal testing machine. The operating conditions for the mechanical seals were as follows. Sealed fluid: tap water; sealed fluid pressure: 15 kg/cm$^2$; rate of rotation: 410 RPM. The required average power was determined for one hour just after starting the operation. When the required power was large, the coefficient of friction was also large, so that the sliding performance is conveniently evaluated from the magnitude of the required power.

Using the above method, first the average required power for Cemented Carbides 1, 3 and 13 of the present invention, and Comparative Cemented Carbides 1 and 4 as shown in Table 1 were measured. For easy comparison of the results, the power required for Comparative Cemented Carbides 1 was set at unity and ratios to this unity were calculated to give the power ratios of Table 1. Similar power ratios were obtained in the results for the test conditions of 60 mm diameter, 5 kg/cm$^2$, turbine oil and 3.600 RPM.

These results show that all the cemented carbides of the present invention have a smaller power ratio than Comparative Cemented Carbide 1, so that the performance of these cemented carbides of the present invention can be said to be superior to Comparative Cemented Carbide 1. The power ratio of Comparative Cemented Carbide 4 is small, but the pores are too large so that the volume of leakage is high, as shown in FIG. 8. This material, therefore, is judged to be no practical use.

In the same way the average required power for Cemented Carbides 14, 18, 22, and 23 of the present invention, and the corresponding poreless cemented carbides, Comparative Cemented Carbides 6, 7, 8 and 9 were measured, with the results shown in Table 2. In all cases, the power ratio of the cemented carbides of the present invention were 0.7 to 0.8 with reference to the comparative cemented carbides. Specifically, the pore-dispersed cemented carbides of the present invention is superior in comparison with the conventional cemented carbides in the sliding characteristics.

EMBODIMENT 4

Rotary seal rings of an inner diameter of 60 mm were fabricated from Cemented Carbides 1 and 3 of Table 1. Similar rotary seal rings were also formed using the Comparative Cemented Carbides 1 and 4.

Figure 7:
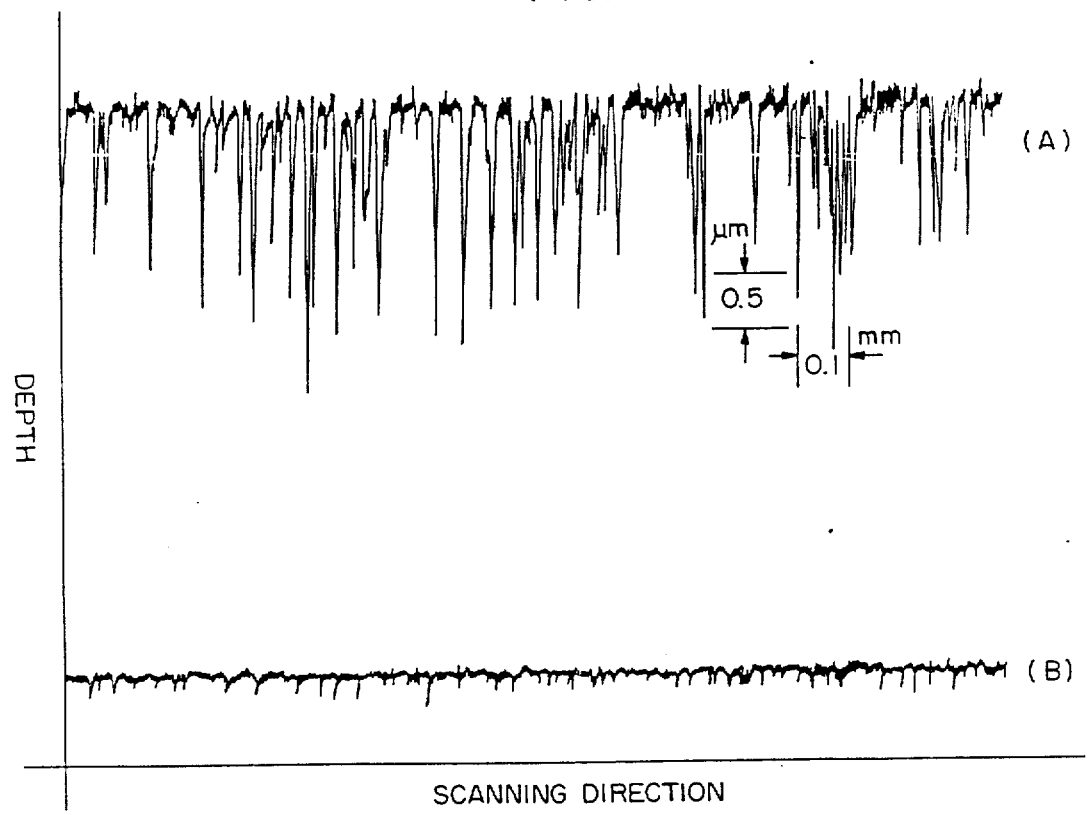
FIG. 7 is a graph showing the results of the measurement of the roughness of the seal surface.

The seal surface of the sealing rings made from Cemented Carbides 1 and 3 of the present invention and from the Comparative Cemented Carbide 4 were finished by lapping. A polishing process was carried out on the sealing surface of the seal ring made from Comparative Cemented Carbide 1 after the lapping process was performed on it. A contact needle type of surface roughness measuring device was used to measure the sealing surface of the seal ring of Cemented Carbide 3 of the present invention and of the seal ring of Comparative Cemented Carbide 1. The results are shown in FIG. 7. (A) represents Cemented Carbide 3 of the present invention and (B) Comparative Cemented Carbide 1. As is clearly shown from FIG. 7, the holes in the seal surface of Cemented Carbide 3 of the present invention are deeper, and only shallow holes were formed by polishing.

An unbalanced type of mechanical seal (the seal shown in FIG. 1) was fabricated using rotating seal rings made from Cemented Carbides 1 and 3 of the present invention and from Comparative Cemented Carbides 1 and 4, formed with the same dimensions as the Embodiments 3, and a leak test was implemented. The non-rotating seal rings were all made from carbon. The test was performed under severe conditions in which blisters are easily formed, using a unit with a sealed fluid of a viscosity of 1000 to 1500 cps, a fluid temperature of 13° to 23° C., and a fluid pressure of 5 kg/cm². The speed of rotation was 3600 RPM and the amount of leak per unit time period was measured. The results are shown in FIG. 8.

Initially the amount of leakage was small for Comparative Cemented Carbide 1, because the holes were small and shallow as a result of the lapping process, but as time passed the holes became flooded and it was impossible to maintain the lubrication capabilities of the seal face. After 10 hours of operation, the volume of leakage became large with blisters developed.

On the other hand, the volume ratio of the pores in Cemented Carbide 1 of the present invention was comparatively small, so that, although blisters did appear after 20 hours of operation, double the effective life span of Comparative Cemented Carbide 1 was obtained. With Cemented Carbide 3 of the present invention, which had a large pore volume ratio, a remarkable effect was observed, inasmuch as the amount of leakage did not increase even after more than 40 hours of operation. With Comparative Cemented carbide 4, blisters did not develop, but the volume of leakage exceeded the practical range right from the start of the operation, making this cemented carbide impractical for actual use as a seal ring.

EMBODIMENT 5

This embodiment differs from Embodiments 3 and 4 inasmuch as only the sliding surfaces of the seal rings were fabricated from the pore-dispersed cemented carbide.

A powder obtained by means of the above-mentioned A step was first pressed, then a powder which did not contain a pore-forming resin was pressed to obtain an pressed body integrally formed from both powders. A sintered body was obtained from this integrated body by means of the B to D steps and was further processed, using a diamond wheel or the like, to give a seal ring with an Rmax=10 μm, an inner diameter of 60 mm, an outer diameter of 70 mm, and a thickness 5 mm. Here the pore-dispersed cemented carbide of the sealing surface was the same as Cemented Carbide 3 of the present invention. The cemented carbide to which this material was integrally joined was a WC-6.5% Co composition, the same as Cemented Carbide 3 of the present invention. In addition, the pore-dispersed Cemented Carbide 3 of the sliding surface had two levels —0.5 mm and 1 mm in thickness. For a comparison of the strengths, seal rings were also fabricated entirely of the pore-dispersed cemented carbide. Five samples of each ring were produced. Three were used in the strength tests and two were used for leakage tests using the same method as in Embodiment 4. In this case, a lapped mirror finish was applied to the sliding surface of the rings used in the leakage tests.

Figure 9:
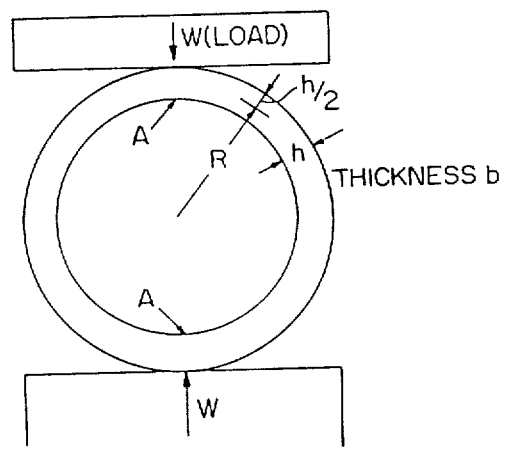
FIG. 9 is an explanation drawing of a test for sealing strength.

The strength test was performed according to the JIS Z.2507-1960 press ring test. FIG. 9 is a drawing of a typical set up for this method. As shown in the drawing, a load W was applied, acting in the vertical direction on the ring, and the maximum tensile stress was produced at point A in the diagram. This value is designated as $\sigma$ and is given by the following equation:

$$\sigma = \{(1/R - 6/(h - h^2/(2R))\} x(-WR)/(\pi b h)$$

where
- h: ring width,
- b: ring thickness
- R: ring radius
- R = (inner diameter + outer diameter)/4

Using this method, the load and the tensile stress at the moment the ring broke under this load were obtained for the respective rings. The average values are shown in Table 3. These figures show that the strength of the seal rings 1 and 2 of the present invention, in which only the sliding surface is made from the pore-dispersed cemented carbide, is about 50% higher than the strength of the seal ring 3 of the present invention, in which the entire seal ring is made from the pore-dispersed cemented carbide.

The results of the leakage test confirm that the seal rings 1 and 2 of the present invention are highly superior, which is compatible with the results as outlined in Embodiment 4. It is possible to obtain exactly the same characteristics as in the case where the entire seal ring is formed from Cemented Carbide 3 of the present invention as shown in FIG. 8. Accordingly, it is clearly seen that the seal characteristics are equivalent to those of the seal ring with only the sliding surface made of the pore-dispersed cemented carbide, and the strength is higher. Accordingly, this material is suitable as a highly loaded seal (high PV value).

TABLE 1

| Type of Cemented Carbide | | Organic material | | | Den-sity g/cm³ | Pore | | Hard-ness $H_R$ A | Deflective Strength Kg/mm² | Power ratio |
|---|---|---|---|---|---|---|---|---|---|---|
| | | Type | Shape and dimensions | Amount % by volume | | Shape and dimensions μm | Volume ratio % by volume | | | |
| A | 1 | Low density polyethylene | Spher. 11φ | 6.0 | 14.65 | Spher. 9φ | 1.7 | 88.2 | 175 | 0.9 |
| | 2 | Low density | Spher. 11φ | 29.8 | 13.73 | Spher. 9φ | 7.9 | 84.2 | 132 | — |

TABLE 1-continued

| Type of Cemented Carbide | | Organic material | | | | Pore | | Hardness $H_R A$ | Deflective Strength $Kg/mm^2$ | Power ratio |
|---|---|---|---|---|---|---|---|---|---|---|
| | | Type | Shape and dimensions | Amount % by volume | Density $g/cm^3$ | Shape and dimensions $\mu m$ | Volume ratio % by volume | | | |
| | 3 | Low density polyethylene | Spher. 11φ | 49.7 | 13.12 | Spher. 9φ | 12.0 | 81.5 | 112 | 0.8 |
| | 4 | Ethylene acrylate copolymer | Spher. 13φ | 29.5 | 14.00 | Spher. 11φ | 6.1 | 84.7 | 128 | — |
| | 5 | High density polyethlene | Spher. 19φ | 5.7 | 14.57 | Spher. 15φ | 2.3 | 87.4 | 143 | — |
| | 6 | High density polyethlene | Spher. 19φ | 28.9 | 13.06 | Spher. 15φ | 12.4 | 81.2 | 99 | — |
| | 7 | High density polyethylene | Spher. 19φ | 48.7 | 12.12 | Spher. 15φ | 18.7 | 77.2 | 76 | — |
| | 8 | PMMA** | Spher. 25φ | 30.0 | 12.54 | Spher. 20φ | 15.9 | 79.3 | 92 | — |
| | 9 | Polypropylene | Cylind. 20φ × 100λ | 1.3 | 14.83 | Cylind. 16φ × 80λ | 0.5 | 90.2 | 131 | — |
| | 10 | Polypropylene | Cylind. 20φ × 100λ | 4.2 | 14.73 | Cylind. 16φ × 80λ | 1.2 | 89.7 | 105 | — |
| | 11 | Polypropylene | Cylind. 20φ × 100λ | 10.0 | 14.48 | Cylind. 16φ × 80λ | 2.9 | 88.2 | 102 | — |
| | 12 | Polypropylene | Cylind. 20φ × 100λ | 22.6 | 13.91 | Cylind. 16φ × 80λ | 6.7 | 84.8 | 74 | — |
| | 13 | Polypropylene | Cylind. 20φ × 100λ | 40.3 | 12.44 | Cylind. 16φ × 80λ | 16.6 | 75.4 | 52 | 0.7 |
| B | 1 | None | — | 0* | 14.91 | — | 0* | 90.7 | 250 | 1 |
| | 2 | PMMA | Spher. 50φ | 60.0* | 10.74 | Spher. 40φ* | 28.0* | 73.5 | 40 | — |
| | 3 | PMMA | Spher. 150φ | 15.0 | 13.37 | Spher. 120φ* | 10.3 | 82.1 | 37 | — |
| | 4 | PMMA | Spher. 50φ | 30.0 | 12.46 | Spher. 40φ* | 16.5 | 78.0 | 68 | 0.7 |

Note
A: Cemented Carbide of the present invention
B: Comparative Cemented Carbide for reference
*Outside of the range of the present invention. The composition of the sintered material is substantially WC - 6.5 mass % Co.
**Acryl resin (polymethacrylate methyl)

TABLE 2

| Type of cemented carbide | | Amount of organic material | Cemented carbide composition (excepting organic material), mass % | | | | | | | | | | | | | | Sintering temperature, °C | Density g/cm³ | Volume ratio of pores, % by volume | Deflective strength, Kg/mm² | Hardness H_R A |
|---|---|---|---|---|---|---|---|---|---|---|---|---|---|---|---|---|---|---|---|---|---|
| | | | WC | TiC | TaC | NbC | Cr | Cr3C2 | Mo | Mo2C | # | TiN | ## | WB | Fe | Co | Ni | | | | | |
| A | 14 | 30 | 90.0 | | | | | | | | 10.0 | | | | | | | 1700 | 12.8 | 13.2 | 82.0 | 46 |
| | 15 | 30 | 91.64 | | 0.66 | | | | | | 6.7 | 1.0 | | | | | | 1700 | 12.7 | 13.5 | 82.3 | 48 |
| | 16 | 30 | 91.5 | | | 3.5 | | | | | | | | | | 5.0 | | 1430 | 12.2 | 16.7 | 79.2 | 72 |
| | 17 | 30 | 91.2 | | | 3.5 | 0.1 | 0.2 | | | | | | | | 5.0 | | 1340 | 12.1 | 16.5 | 79.5 | 69 |
| | 18 | 30 | 91.0 | | | | | | | | | | | | | 9.0 | | 1340 | 12.5 | 15.3 | 78.0 | 98 |
| | 19 | 30 | 87.5 | | | | | | | | | | | | | 12.5 | | 1340 | 12.5 | 12.5 | 75.3 | 124 |
| | 20 | 30 | 80.0 | | | | | | | | | | | | | 20.0 | | 1310 | 12.0 | 12.1 | 71.4 | 131 |
| | 21 | 30 | 92.0 | | | | 0.2 | | 0.1 | 0.1 | | | | | | | 8.0 | 1420 | 12.6 | 15.0 | 77.6 | 94 |
| | 22 | 30 | 91.3 | | | | 0.5 | 0.3 | 0.3 | 0.2 | | | | | | | | 1340 | 12.5 | 14.8 | 78.8 | 88 |
| | 23 | 30 | 79.5 | | | | | 0.5 | | 20.0 | | | | | | | 15.0 | 1340 | 11.3 | 16.0 | 77.5 | 100 |
| | 24 | 30 | 3.0 | 39.0 | 5 | | | | | | 4.0 | 6.0 | 10.0 | | | 4.0 | 10.0 | 1430 | 5.4 | 15.8 | 79.3 | 66 |
| | 25 | 30 | | | | | | | | | 3.0 | | | 70.0 | | 30.0 | | 1300 | 11.1 | 14.7 | 78.3 | 69 |
| | 26 | 30 | | | | | | | | | | | | 70.0 | | | 30.0 | 1200 | 10.9 | 15.2 | 75.9 | 113 |
| | 27 | 30 | 88.0 | | | | | | | | | | | 2.0 | | 10.0 | | 1400 | 12.4 | 14.3 | 78.1 | 111 |
| B | 5 | 30 | 60.0 | | | | | | | | | | | | | 40* | | 1250 | 10.4 | 13.1 | 64.2 | 81 |
| | 6 | 0* | 90.0 | | | | | | | | 10.0 | | | | | | | 1700 | 14.7 | 0* | 93.0 | 127 |
| | 7 | 0* | 91.0 | | | | | | | | | | | | | 9.0 | | 1340 | 14.7 | 0* | 89.7 | 235 |
| | 8 | 0* | 92.0 | | | | | | | | | | | | | 8.0 | | 1420 | 14.8 | 0* | 89.1 | 227 |
| | 9 | 0* | 79.5 | | | | 0.5 | 0.5 | 0.3 | 0.2 | 4.0 | | | | | | 15.0 | 1340 | 13.5 | 0* | 90.3 | 229 |

Note
A: Cemented Carbide of the present invention
B: Comparative Cemented Carbide
: Amount of organic material, % by volume
: Sintering temperature, °C
: Volume ratio of pores, % by volume
: Deflective strength, Kg/mm²
: WC/TiC/TaC
: TiC/TiN
*: Value outside of the range of the present invention

TABLE 3

| Type of seal ring | | Thickness of layer of pore-dispersed cemented carbide | Ratio of pore-dispersed cemented carbide in seal ring | Average rupture load W (Kgf) | Average rupture stress $\sigma$ (Kgf/mm2) |
| --- | --- | --- | --- | --- | --- |
| Seal ring of present invention | 1 | 0.5 mm | 0.1 | 297 | 156 |
| | 2 | 1.0 mm | 0.2 | 291 | 153 |
| | 3 | 5.0 mm | 1.0 | 200 | 105 |

What is claimed is:

1. A mechanical seal comprising a non-rotating seal ring and a rotating seal ring, at least one of the non-rotating seal ring and the rotating seal ring being made of a pore-dispersed material; the pore-dispersed material containing pores in an amount of 0.5 to 20 volume %, the pores being formed in at least one shape selected from the group of a substantially spherical shape and a substantially cylindrical shape, the pores in the substantially spherical shape having an average diameter of 3 to 20 $\mu$m, the pores in the substantially cylindrical shape having an average diameter of 3 to 20 $\mu$m and an average length in the range from the average diameter up to 300 $\mu$m, and the pores being prevented from linking to each other, so that the lengths of said pores does not exceed 2 mm.

2. A mechanical seal comprising a non-rotating seal ring and a rotating seal ring, at least one of the non-rotating seal ring and the rotating seal ring having at least a sealing surface portion made of a pore-dispersed material with the other portions made of a normal material which have no dispersed pores; the pore-dispersed material containing pores in an amount of 0.5 to 20 volume %, the pores being formed in at least one shape selected from the group of a substantially spherical shape and a substantially cylindrical shape, the pores in the substantially spherical shape having an average diameter of 3 to 20 $\mu$m, the pores in the substantially cylindrical shape having an average diameter of 3 to 20 $\mu$m and an average length in the range from the average diameter up to 300 $\mu$m, and the pores being prevented from linking to each other, so that the length of said pores does not exceed 2 mm.

* * * * *

UNITED STATES PATENT AND TRADEMARK OFFICE
CERTIFICATE OF CORRECTION

PATENT NO. : 4,997,192            Page 1 of 5

DATED        : March 5, 1991

INVENTOR(S) : Yataro Nagai, Mitsuyoshi Matsushita, Osamu Ishibashi, Kiyoshi Terasaki and Kei Tokumoto It is certified that error appears in the above-identified patent and that said Letters Patent is hereby corrected as shown below:

<u>In the Drawings</u>:

Insert Figures 4 through 9, which are attached hereto.

Signed and Sealed this

Sixth Day of October, 1992

Attest:

DOUGLAS B. COMER

*Attesting Officer*      Acting Commissioner of Patents and Trademarks (X50)

(X50)

(X50)